(12) United States Patent
Certain

(10) Patent No.: US 9,302,769 B2
(45) Date of Patent: Apr. 5, 2016

(54) DUCTED ROTOR FOR AN AIRCRAFT AND A ROTORCRAFT

(71) Applicant: AIRBUS HELICOPTERS, Marignane (FR)

(72) Inventor: Bernard Certain, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 173 days.

(21) Appl. No.: 14/267,264

(22) Filed: May 1, 2014

(65) Prior Publication Data

US 2014/0326826 A1 Nov. 6, 2014

(30) Foreign Application Priority Data

May 3, 2013 (FR) ..................................... 13 01033

(51) Int. Cl.
*B64C 27/82* (2006.01)
*B64C 27/467* (2006.01)

(52) U.S. Cl.
CPC ............... *B64C 27/82* (2013.01); *B64C 27/467* (2013.01); *B64C 2027/8254* (2013.01)

(58) Field of Classification Search
CPC ...... B64C 27/467; B64C 27/82; B64C 27/48; B64C 2027/8254; B64C 2027/82
See application file for complete search history.

(56) References Cited

U.S. PATENT DOCUMENTS

| 3,942,910 A | 3/1976 | Snyder et al. | |
|---|---|---|---|
| 4,324,530 A * | 4/1982 | Fradenburgh | B64C 27/463 416/228 |
| 4,927,331 A * | 5/1990 | Vuillet | B64C 11/18 416/238 |
| 5,542,818 A | 8/1996 | Monvaillier et al. | |
| 6,231,308 B1 * | 5/2001 | Kondo | B64C 27/463 416/228 |
| 8,152,465 B2 * | 4/2012 | Jaenker | B64C 27/463 244/17.25 |

FOREIGN PATENT DOCUMENTS

| DE | 102007062490 | 7/2009 |
|---|---|---|
| EP | 0493303 | 7/1992 |
| FR | 1531536 | 7/1968 |
| FR | 2271121 | 12/1975 |
| FR | 2628062 | 9/1989 |
| FR | 2719554 | 11/1995 |
| WO | 2006110156 | 10/2006 |

OTHER PUBLICATIONS

French Search Report for FR 1301033, Completed by the French Patent Office on Dec. 16, 2013, 6 Pages.

* cited by examiner

*Primary Examiner* — Philip J Bonzell
(74) *Attorney, Agent, or Firm* — Brooks Kushman P.C.

(57) ABSTRACT

A rotorcraft ducted rotor comprising a rotary assembly arranged in a passage to rotate about an axis of symmetry (AX1). The rotary assembly (15) has a plurality of blades (20), each fastened to a hub (16), each blade (20) complies with a twisting relationship defining an angle of twist lying in the range zero degrees inclusive to 5 degrees inclusive. Spanwise, each blade (20) comprises a first zone (21) followed by a second zone (22), which second zone presents rearward sweep, being provided with a second trailing edge (30") situated downstream from a first trailing edge (30') of the first zone (21). Each first zone (21) includes a root (24) connected to the hub (16) by a fastener device (40) having a rolling bearing (45) without clearance and a conical laminated abutment (50).

14 Claims, 3 Drawing Sheets

DUCTED ROTOR FOR AN AIRCRAFT AND A ROTORCRAFT

CROSS REFERENCE TO RELATED APPLICATION

This application claims priority to French patent application No. FR 13 01033 filed on May 3, 2013, the disclosure of which is incorporated in its entirety by reference herein.

BACKGROUND OF THE INVENTION (1) Field of the Invention

The present invention relates to a ducted rotor for a rotorcraft, and also to a rotorcraft having such a rotor, and more particularly a tail rotor of a helicopter.

The invention thus lies in the narrow technical field of aircraft rotors.

(2) Description of Related Art

For example, a helicopter generally has a single main rotor mechanically driven by at least one engine, the main rotor serving to provide the helicopter with lift and with propulsion.

That type of helicopter is also provided with a tail rotor that performs an anti-torque function so as to compensate for the yaw torque created by the rotation of the main rotor, the tail rotor exerting thrust transversely.

Furthermore, the tail rotor enables the pilot to control yaw and steering movements of the helicopter by exerting positive or negative transverse thrust.

A non-ducted tail rotor is known for performing this function, which rotor is referred to as a "conventional" tail rotor, for convenience. Conventionally, the non-ducted tail rotor is mounted on one side near a top end of a tail stabilizer or on one end of the tail boom of the helicopter.

Such a non-ducted tail rotor is in widespread use. Nevertheless, it is also possible to implement a ducted tail rotor, e.g. the rotor known under the trademark Fenestron®.

A ducted tail rotor comprises a rotor arranged in a passage formed through the vertical tail fin of a helicopter, the axis of symmetry of the passage being substantially perpendicular to the vertical anteroposterior plane of symmetry of the helicopter.

As a result, the streamlined structure of the vertical fin of the helicopter surrounds said passage and thus the tail rotor, and the wall of the passage itself is also known to the person skilled in the art as a "duct", which explains why it is referred to as a "ducted tail rotor". Such a rotor is referred to as a "ducted rotor" for convenience in the description below.

The streamlined structure then protects the tail rotor from impacts against elements external to the aircraft. Likewise, the streamlined structure increases the safety of ground personnel, by preventing such personnel being injured by the tail rotor.

The streamlined structure that surrounds the passage in which the tail rotor is arranged prevents noise from diffusing forwards, downwards, and rearwards relative to the rotorcraft, whereas a non-ducted tail rotor diffuses noise in all directions.

Conventionally, a ducted rotor has a rotor with a hub carrying a plurality of blades that rotate in the passage of the duct.

Each blade may be fastened to the hub, e.g. by a strip that can deform in twisting, sometimes referred to as a "twist strip". Bearings having elastomer elements are arranged between each blade and the body of the hub. The bearings give the blade freedom to move in turning about the pitch axis in order to change pitch, and also a certain amount of freedom to perform flapping motion and lead-lag motion.

Each blade may also have a collar carrying a pitch lever. The pitch levers of the rotor are then connected to a pitch control disk. Consequently, the aircraft includes control means for controlling the pitch of the blades via the control disk. Conventionally, such control means include pedals.

Each blade may also include at least one balance weight, such as the weights known as "Chinese weights".

Furthermore, a ducted rotor blade usually presents a shape that is rectangular with a large amount of twist.

It should be recalled that the geometrical twist of a blade may be defined as the angle formed between the axis of the chord of each section of the blade relative to a reference plane of the blade. Sometimes each section of the blade is twisted relative to the pitch variation axis of the blade by an angle that is identified relative to one such reference plane. Under such conditions, the term "twist relationship" is used to designate how said twist angles vary along the span of the blade.

The blades of a ducted rotor present a large amount of twist, with the twist angle separating two distinct sections possibly being about 20 degrees, for example.

Upstream from the blades, the streams of air in the passage present angles of incidence that vary as a function of their span positions along the blade. Thus, the angle of incidence of the air stream relative to a root of the blade is usually different from the angle of incidence of the air stream upstream from the distal end of the blade.

In order to generate a uniform induced speed, a manufacturer twists each blade so as to take these different angles of incidence into account.

Furthermore, the hub is driven in rotation by a power transmission gearbox fastened to the duct, e.g. by downstream support bars of the rotor. These support bars may be streamlined as to constitute stationary vanes redirecting the flow direction of the stream of air downstream from the rotor. Under such circumstances, the assembly comprising these support bars is sometimes referred to as a stator guide vane assembly for the air stream.

It should be observed that the terms "upstream" and "downstream" are defined relative to the flow direction of air through the passage.

It can be understood that the term "ducted rotor" is used below to designate the entire assembly comprising in particular the duct, the rotor as such, the power transmission gearbox, and the guide vanes present downstream from the blades. The ducted rotor thus includes in particular the duct and the element present inside the passage defined by the duct.

Document FR 1 531 536 describes a ducted tail rotor. Each blade comprises an elongate element capable of twisting that is fastened to the hub by means of a bolt. The elongate element may comprise a plurality of thin strips touching one another.

Document FR 2 719 554 describes a ducted anti-torque rotor with floating blades. Each blade is connected to a hub by a footing portion including at least an arm that is twistable about a pitch-change axis. The arm is then housed in a sleeve of the blade root that presents two bearing surfaces in which the sleeve is journaled with radial clearance in both bearings of the hub.

Document EP 1 778 951 describes an anti-torque device for a helicopter. That device has blades of scimitar shape.

Under such conditions, ducted rotors present advantageous functional characteristics.

Nevertheless, the behavior of a ducted tail rotor of a rotorcraft can differ from the behavior of a non-ducted tail rotor. This behavior may be illustrated by a characteristic curve presenting the thrust developed by a tail rotor as a function of the position of means for controlling the pitch of the blades of the tail rotor, e.g. the position of pedals.

The characteristic curve plotting the response of a conventional non-ducted tail rotor to control action is substantially linear.

In contrast, the characteristic curve of a ducted tail rotor presents a relatively flat portion while the control means are lying in an intermediate range requesting little or even no thrust. That intermediate range corresponds to an intermediate stage of flight that occurs between a stage requesting thrust directed in the direction of rotation of the main rotor, and a stage requesting thrust directed in the direction opposite to the direction of rotation of the main rotor.

In other words, during that intermediate flight stage, modifying the position of the control means does not give rise to a thrust modification equivalent to the thrust modification that would be obtained during stationary stages for a control action of the same amplitude.

This feature is known. Under such circumstances, a pilot knows for example that it is appropriate to move the control means through a greater distance in order to obtain a response from a ducted tail rotor during an intermediate stage of flight. That situation can be uncomfortable, but remains acceptable given the advantages of a ducted tail rotor.

Furthermore, the bearings that hold the blades tend to wear relatively quickly.

Document FR 2 271 121 is remote from the technical field of the invention, presenting a device for coupling a blade to a yoke of a mast of a rotary wing.

That device includes one fastener member per blade. Each fastener member is hinged firstly to the yoke, in particular via an elastomer bearing, and is secondly provided with four tabs bolted to a blade. In addition, each fastener member is connected to a tube for controlling the pitch of the blade.

Also known are Documents FR 2 628 062, EP 0 493 303, and DE 102007062490.

BRIEF SUMMARY OF THE INVENTION

An object of the present invention is thus to propose a robust ducted tail rotor having operation that tends to be more linear than the operation of certain ducted tail rotors.

The invention thus relates to a ducted rotor for controlling the yaw movement of a rotorcraft, the ducted rotor comprising a duct defining an air-flow passage. The ducted rotor also has a rotary assembly arranged in the passage to rotate about an axis of symmetry of the passage, the rotary assembly having a plurality of blades, each fastened to a hub.

Under such circumstances, each blade comprises a twisting relationship defining a maximum angle of twist lying in the range zero degrees inclusive to 5 degrees inclusive.

Spanwise, each blade comprises a footing first zone that is fastened to the hub and that is followed by an end second zone, the second zone extending radially from the first zone to a distal end of the blade, the second zone presenting a rearward sweep, and being provided with a second trailing edge situated downstream from a first trailing edge of the first zone in the direction of rotation of the blade in the passage.

Each first zone includes a root connected to the hub by a fastener device provided with a rolling bearing and a conical laminated abutment.

The ducted rotor is thus provided with blades presenting a maximum twist angle that is small or even zero. It should be recalled that this characteristic means that each section presents a twist angle lying in the range zero degrees inclusive to 5 degrees inclusive relative to a reference section, e.g. a footing section. Twisting may be continuous, with the greatest twist angle being between the footing section and the end section of the blade.

The bearing may then be a rolling bearing "without clearance", i.e. a bearing having operating clearance of the order of a few hundredths of a millimeter. A rolling bearing without clearance is thus a rolling bearing with clearance that is minimized, this clearance possibly being less than one tenth of a millimeter.

Under such circumstances, the invention goes against the prejudice whereby a Fenestron blade must have a large twist amplitude, e.g. of the order of 20 degrees.

The Applicant has found that the non-linear zone observed in the characteristic curve of a ducted rotor results from the blades having a large amount of twist.

When a blade presents a pitch angle lying in a narrow range, and given the twist of the blade, the root of the blade and the end of the blade then tend to possess opposite angles of incidence relative to the air streams. The root of the blade then tends to generate thrust in one direction while the end of the blade tends to exert thrust in an opposite direction.

Under such circumstances, the ducted rotor tends not to react when a pilot positions the pitch of the blades in such a range.

By using blades with little or no twist, this problem tends to be solved. All of the sections of the blade then exert thrust in the same direction. Nevertheless, this technique leads to degraded performance of the ducted rotor, which explains why it has not been used. In order to avoid excessive degradation tending to put too great a limit on the maximum thrust that can be generated by the ducted rotor, the invention proposes associating the use of a small amount of twist with an end second zone of the blade that presents a rearward sweep.

The rearward sweep reduces the angle of incidence of the air relative to the profiles of the blade and pushes back the appearance of stalling. The rearward sweep enables a blade with little or no twist to rotate about the axis of rotation of the rotor at a high speed without stalling. Under such circumstances, the rearward sweep allows the ducted rotor to generate high thrust by rotating quickly.

In addition, if the blade presents a certain amount of flexibility in twisting, then the end zone presents an offset that can tend to cause the blade to deform locally under the effect of the lift generated by the offset. Under such circumstances, it is appropriate to ensure the blade is properly positioned in the duct in order to avoid flapping deformation that would tend to cause the blade to exit the passage, it being understood that such deformation is to be expected because of the flexibility of said blade.

Furthermore, each blade is fastened to the hub by a novel fastener device based on using a rolling bearing seeking to reduce the friction that is observed on elastomer bearings in the prior art.

Ordinary elastomer bearings provide clearance that allows flapping motion and lead-lag motion of the blade. That operating clearance can tend to disturb the operation of the ducted rotor and to degrade the bearings.

When the ducted rotor develops a high level of thrust, the centrifugal force exerted on the blade tends to limit the effect of this clearance. Conversely, at low thrust, the blade can perform lead-lag motion and flapping motions, which then leads to wear of the bearings. Furthermore, such motions of the blade can generate impacts that are perceived by a crew.

The fastener device of the invention makes it possible to remedy that.

The above-specified combinations of characteristics thus tend to linearize the characteristic curve of a robust ducted rotor.

The rotor may also include one or more of the following additional characteristics.

By way of example, the above-described rotor may present a small amount of twist.

Nevertheless, the maximum angle may be zero. In other words, in this variant, the blade is not twisted. This variant procures good stability, particularly when the thrust exerted by the ducted rotor is zero.

Furthermore, the second zone may include a rearward sweep presenting an angle of inclination of at least 30 degrees relative to the span of the blade. Such sweep makes it possible to obtain satisfactory thrust in the absence of twist or in the presence of a very small amount of twist. The rearward sweep serves to maximize the speed of rotation of the blade without increasing the noise it emits by locally reducing the Mach number.

Furthermore, the center of aerodynamic thrust on the blade may be situated in a space extending from the trailing edge of said blade to a geometric axis of symmetry of said bearing so that the rearward sweep can generate twist locally when the blade presents appropriate flexibility in twisting.

The center of gravity of the blade is optionally situated on the geometric axis of symmetry of said bearing to avoid deformation of the bearing under the effect of centrifugal forces.

In addition, the second end zone may have aerodynamic profiles, each presenting a chord that is greater than each of the chords of the profiles of the first zone.

Furthermore, the bearing is optionally a ceramic roller bearing. Furthermore, the bearing may include a ring secured to the root of the blade. Ceramic rollers present the advantage of minimizing the risks of the so-called "false brinelling" phenomenon appearing.

Centrifugal forces are taken up by the conical laminated abutment, with the forces that result from any flapping or lead-lag motion of the blade being taken up by the roller bearing. It should be observed that this design does not require the use of twist strips, thereby making it possible to optimize the size of the hub.

In addition, the laminated abutment may comprise an outer strength member and an inner strength member, with an elastomer member of annular shape connecting the inner strength member to the outer strength member, the root passing through the bearing and the elastomer member in order to be fastened to the inner strength member by at least one fastener rod.

The elastomer member comprises a succession of flexible layers of elastomer material and rigid layers.

The fastener device is relatively simple and compact.

The inner strength member may then optionally be fastened to the hub.

Furthermore, the ducted rotor includes one pitch lever per blade, each pitch lever being hinged to an inner strength member.

Also, at least one balance weight is fastened to said inner strength member.

Two weights are preferably fastened on the inner strength member symmetrically about the pitch axis of the blade so as to avoid generating any lateral force on the fastener device.

Furthermore, said elastomer member may have radial thickness decreasing in compliance with a predetermined thickness reduction relationship on going from the inner strength member towards the outer strength member. This characteristic seeks to guarantee that each layer of elastomer is subjected to the same pressure in spite of the change in diameter.

Finally, the invention provides a rotorcraft including a rotor of the invention.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements present in more than one of the figures are given the same references in each of them.

DETAILED DESCRIPTION OF THE INVENTION

Figure 1:
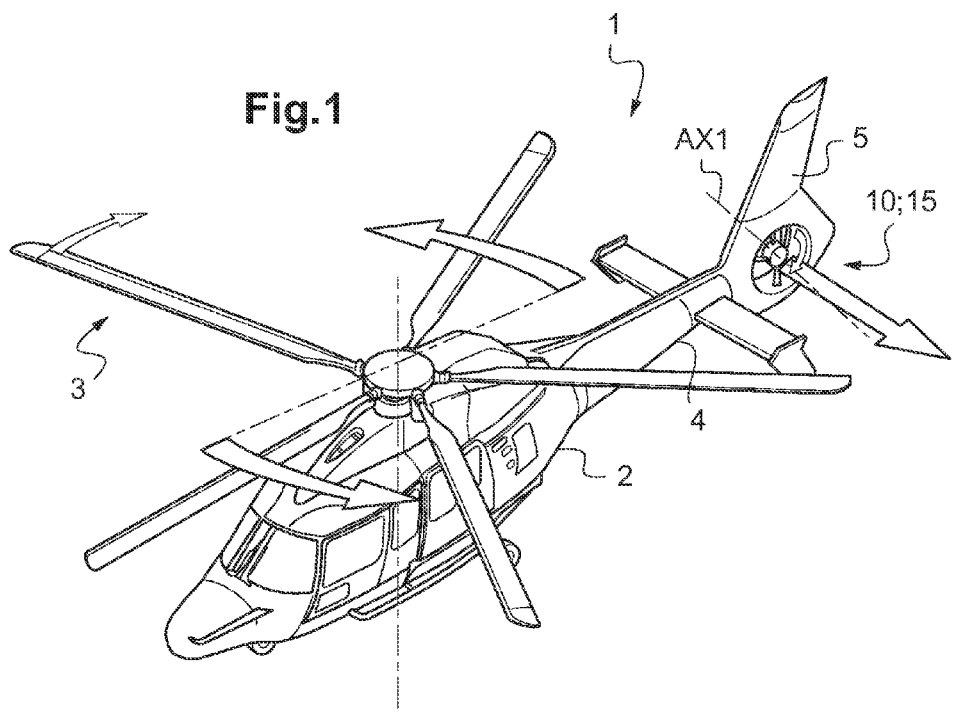
FIG. 1 shows a rotorcraft of the invention.

FIG. 1 shows a rotorcraft 1 having a fuselage 2 carrying a rotary wing 3. The fuselage 2 includes a tail boom 4 carrying a fin 5. The fin 5 includes a ducted rotor 10 of the invention that is provided with a rotary assembly 15.

Figure 2:
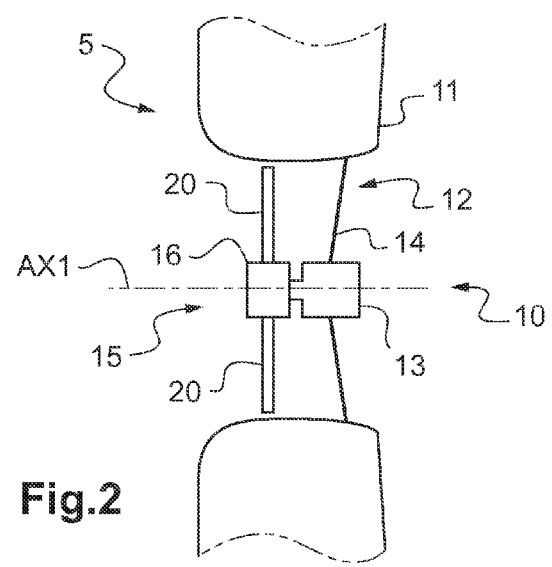
FIG. 2 is a view of the ducted rotor of the rotorcraft.

With reference to FIG. 2, the ducted rotor 10 includes a duct 11 through the fin. The ducted rotor 10 then possesses an air-flow passage 12 passing along the duct 11 along an axis of symmetry AX1. This axis of symmetry AX1 may be substantially orthogonal to an anteroposterior plane of symmetry of the rotorcraft.

Under such circumstances, the rotor assembly 15 is arranged in the passage to rotate about the axis of symmetry AX1. For this purpose, the ducted rotor may comprise drive means 14 such as a motor or a power transmission gearbox, supported by vanes 14 in the passage 12. The rotary assembly also includes a plurality of blades 20 that are set into rotation by a hub 16 driven by the drive means 14.

Figure 3:
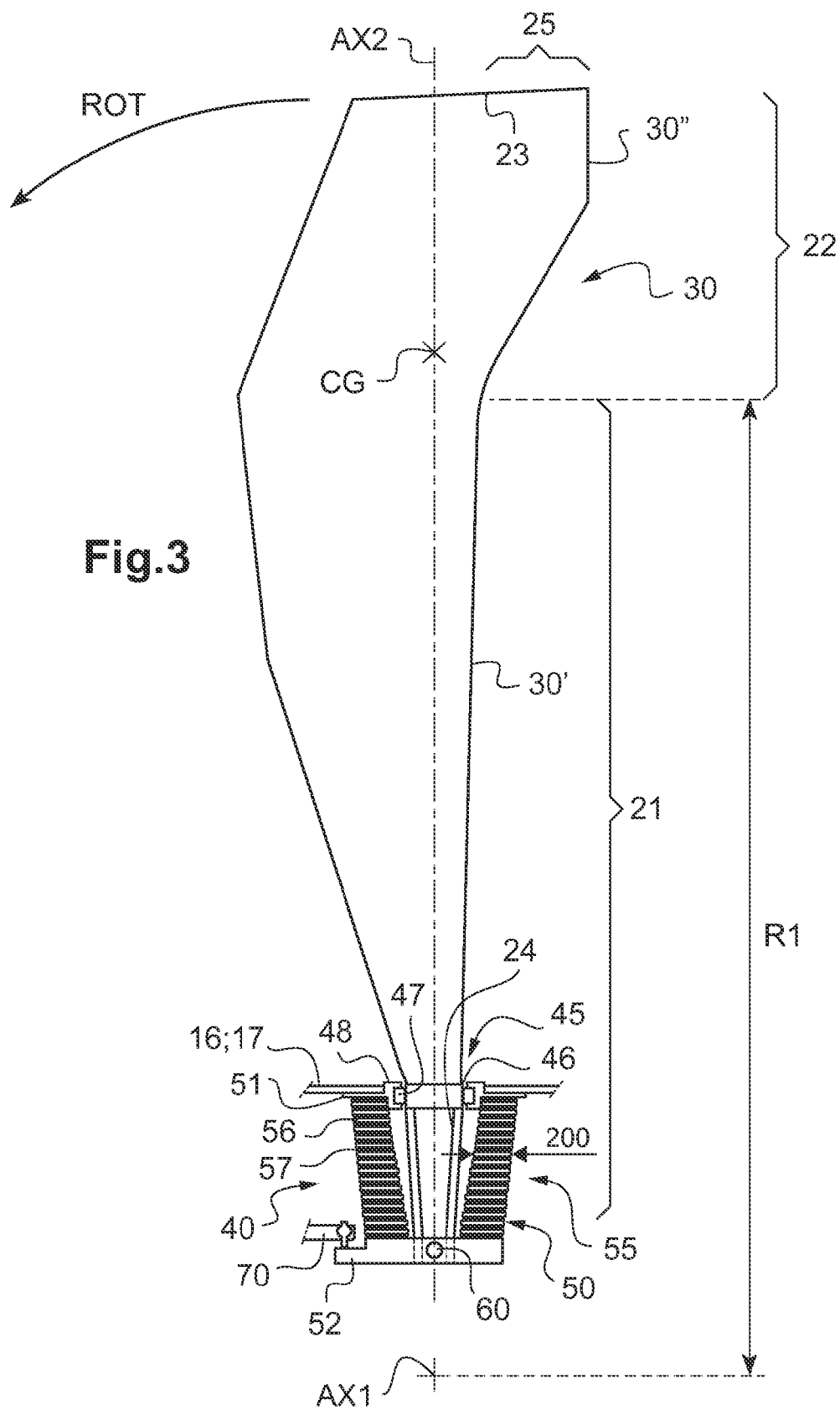
FIG. 3 is a diagram of a blade and of the device for fastening the blade.

With reference to FIG. 3, each blade 20 extends spanwise from a root 24 that is fastened to the hub 16 by a fastener device 50 to a distal end 25. More precisely, each blade may be subdivided into a first zone 21 including the root 24 and a second zone 22 including the distal end 23.

The first zone 21 then extends from the root to reach a radius R1 measured radially from the axis of symmetry AX1, the second zone 22 extending from this radius R1 to the distal end 23.

Figure 4:
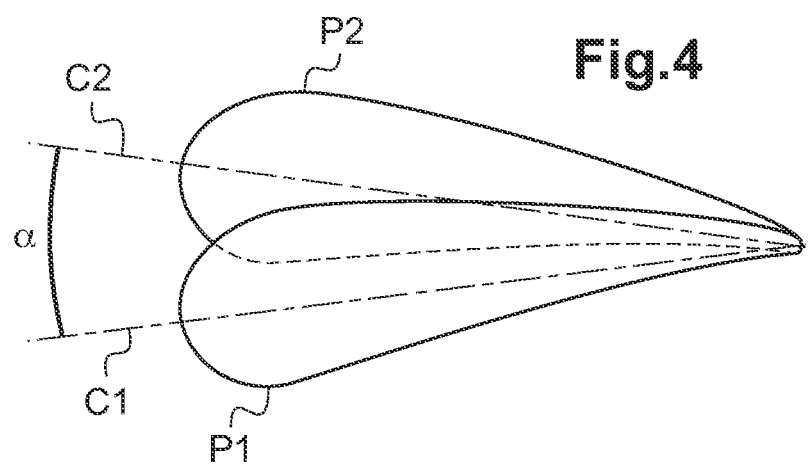
FIG. 4 is a diagram explaining the maximum twist angle of the blade.

Each blade 20 may be twisted. As shown in FIG. 4, the blade may have a maximum amplitude of twist between two distinct sections P1, P2 lying in a range zero degrees to 5 degrees, the end points of the range being included in the range.

The twist angle a between two sections P1, P2 may for example be measured between the chord axes C1, C2 connecting the leading edge to the trailing edge of each section. The term "chord axis" is used to designate the axis of the blade connecting the leading edge to the trailing edge of a section for which the section chord is being measured.

The maximum angle may be reached for example between the first section of the blade and the last section constituting the distal end 23.

Nevertheless, and in a variant, the blade is not twisted. All of the chord axes then lie in a single plane.

With reference to FIG. 3, the second zone is swept back, presenting a rearward offset 25, i.e. a portion that is offset rearwards relative to the first zone.

Thus, the trailing edge 30 of the blade has a first trailing edge 30' in the first zone 21, and a second trailing edge 30" in the second zone 22. Under such circumstances, the first trailing edge 30' is upstream from the second trailing edge 30", where the term "upstream" and "downstream" should be considered as a function of the direction of rotation ROT of the blade in the passage.

If the blade is not twisted or if its maximum amplitude of twist is very small, depending on the variant and for a flexible blade, this offset enables the blade to deform at high speeds of rotation of the rotor in order to maximize the thrust exerted by the ducted rotor.

The rearward sweep of the second zone 22 may also present an angle of inclination of 30 degrees relative to a straight blade.

In addition, the center of gravity CG of the blade 20 may be situated close to a geometric axis AX2 of symmetry of the fastener device 50, and in particular of a bearing of the fastener device 50.

Optionally, the center of gravity CG is located on the geometric axis AX2.

Furthermore, the fastener device 50 includes a rolling bearing 45 associated with a laminated abutment 50.

The bearing 45 may comprise a bearing having ceramic rollers, preferably without clearance, having an inner cage 46, a plurality of rollers 47, and an outer cage 48.

The inner cage 46 may represent a ring secured to the root 24 of the blade. The root then passes through the inner cage 46, to which it is secured.

The outer cage 48 may for example be secured to a member 17 of the hub 16.

In addition, the laminated abutment 50 is a hollow conical abutment through which the root 24 passes. This laminated abutment is thus provided with an outer strength member 51 and an inner strength member 52 sandwiching an elastomer member 55. The root 24 passes in succession through the outer strength member 51, then through the elastomer member 55, and is fastened to the inner strength member 52 by a fastener rod 60.

The outer strength member 51 may comprise a ring secured to the outer cage 48 of the bearing. This outer strength member 51 and this outer cage 48 can then together form a single structural part obtained as a single piece by machining.

The outer strength member 51 is then fastened to a member 17 of the hub.

The elastomer member 55 may also be provided with a succession of flexible layers 57 of elastomer material and rigid layers 56. The rigid layers may for example be layers of metal, based on alloy, or layers of composite materials, for example.

Furthermore, the elastomer member is in the shape of an annular cone presenting radial thickness 200 that decreases in compliance with a predetermined thickness reduction relationship on going from the inner strength member 52 towards the outer strength member 51.

In order to modify the pitch of the blade, the ducted rotor also has a pitch lever 70 hinged to the inner strength member 52.

This lever 70 thus causes the outer strength member to turn, thereby modifying the pitch of the blade 20 by means of the fastener rod 60. The laminated abutment 55 can accommodate such turning movement.

The centrifugal forces exerted on the blade 20 are transmitted to the hub 16 successively via the fastener rod 60, the inner strength member 52, the elastomer member, and then the outer strength member 51.

The forces resulting from flapping and/or lead-lag motions of the blade are taken up by the bearing 45.

Figure 5:
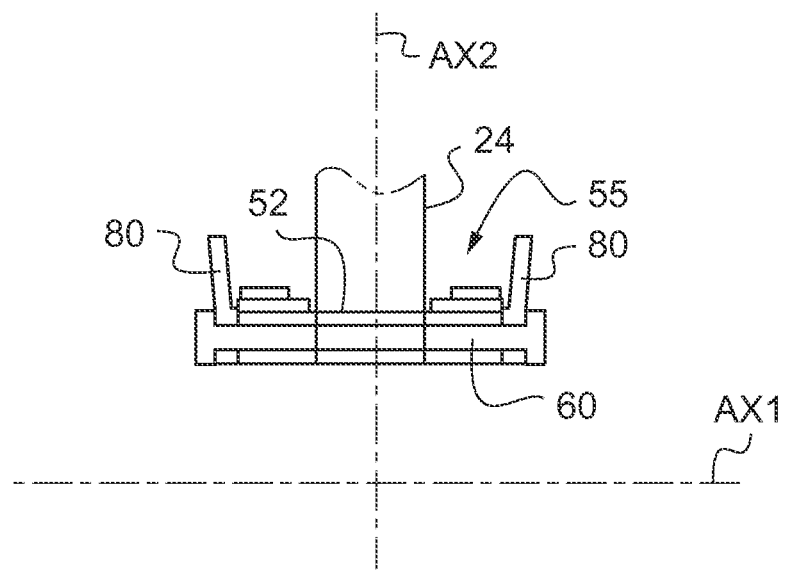
FIG. 5 is a view showing two balancing weights known as "Chinese weights" that reduce the pitch control forces.

With reference to FIG. 5, the ducted rotor may include at least one balance weight 80 fastened to the inner strength member 52, e.g. by the fastener rod 60.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A ducted rotor for controlling yaw movement of a rotorcraft, the ducted rotor comprising a duct defining an air-flow passage, said ducted rotor having a rotary assembly arranged in the passage to rotate about an axis of symmetry of said passage, said rotary assembly having a plurality of blades, each fastened to a hub, wherein:
   each blade comprises a twisting relationship defining a maximum angle of twist (a) lying in the range of zero degrees inclusive to 5 degrees inclusive;
   spanwise, each blade comprises a footing first zone that is fastened to the hub and that is followed by an end second zone, the second zone extending radially from said first zone to a distal end of the blade, said second zone presenting a rearward sweep, and being provided with a second trailing edge situated downstream from a first trailing edge of the first zone in the direction (ROT) of rotation of the blade in the passage; and
   each first zone includes a root connected to the hub by a fastener device provided with a rolling bearing and a conical laminated abutment.

2. A rotor according to claim 1, wherein said maximum angle (α) is zero.

3. A rotor according to claim 1, wherein the center of gravity of the blade is situated on a geometric axis of symmetry of said bearing.

4. A rotor according to claim 1, wherein said second zone includes a rearward sweep presenting an angle of inclination of at least 30 degrees.

5. A rotor according to claim 1, wherein said bearing is a rolling bearing without clearance.

6. A rotorcraft, wherein the rotorcraft includes a ducted rotor according to claim 1.

7. A rotor according to claim 1, wherein said bearing is a ceramic roller bearing.

8. A rotor according to claim 7, wherein said bearing includes a ring secured to said root.

9. A rotor according to claim 1, wherein said laminated abutment comprises an outer strength member and an inner strength member, with an elastomer member of annular shape connecting the inner strength member to the outer strength member, said root passing through said bearing and the elastomer member in order to be fastened to the inner strength member by at least one fastener rod.

10. A rotor according to claim 9, wherein said inner strength member is fastened to the hub.

11. A rotor according to claim 9, wherein said ducted rotor includes one pitch lever per blade, each pitch lever being hinged to an inner strength member.

12. A rotor according to claim 9, wherein at least one balance weight is fastened to said inner strength member.

13. A rotor according to claim 9, wherein said elastomer member has radial thickness decreasing in compliance with a predetermined thickness reduction relationship on going from the inner strength member towards the outer strength member.

14. A rotor according to claim 9, wherein said elastomer member comprises a succession of flexible layers of elastomer material and of rigid layers.

* * * * *